US009280028B2

(12) United States Patent
Gu

(10) Patent No.: US 9,280,028 B2
(45) Date of Patent: Mar. 8, 2016

(54) ELECTROCHROMIC DISPLAY DEVICE AND METHOD OF PRODUCING THE SAME

(71) Applicant: BOE Technology Group Co., Ltd., Beijing (CN)

(72) Inventor: Xin Gu, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 122 days.

(21) Appl. No.: 13/968,086

(22) Filed: Aug. 15, 2013

(65) Prior Publication Data

US 2014/0049805 A1    Feb. 20, 2014

(30) Foreign Application Priority Data

Aug. 17, 2012   (CN) .......................... 2012 1 0295912

(51) Int. Cl.
G02F 1/15     (2006.01)
G02F 1/153    (2006.01)
G09G 3/34     (2006.01)
(Continued)

(52) U.S. Cl.
CPC ................ G02F 1/155 (2013.01); G02F 1/061 (2013.01); G02F 1/1533 (2013.01); *G02B 2027/0118* (2013.01); *G02F 1/0018* (2013.01); *G02F 1/0107* (2013.01); *G02F 1/133377* (2013.01); *G02F 1/15* (2013.01); *G02F 1/153* (2013.01); *G02F 1/157* (2013.01); *G02F 1/1521* (2013.01); *G02F 1/161* (2013.01); *G02F 1/167* (2013.01); *G02F 2001/1515* (2013.01); *G02F 2202/00* (2013.01)

(58) Field of Classification Search
CPC .......... G02F 1/157; G02F 1/161; G02F 1/15; G02F 1/153; G02F 1/1521; G02F 1/167; G02F 2001/1515; G02F 1/0018; G02F 1/0107; G02F 1/33377; G02F 2202/00; G02F 2027/0118
USPC .............................. 359/265–274; 345/84, 105
See application file for complete search history.

(56) References Cited

U.S. PATENT DOCUMENTS

2006/0139724 A1*  6/2006  Liang et al. ................... 359/265
2007/0091061 A1   4/2007  Schlangen et al.
2011/0141544 A1   6/2011  Suzuki et al.

FOREIGN PATENT DOCUMENTS

CN    1482509 A    3/2004
CN    1806199 A    7/2006
(Continued)

OTHER PUBLICATIONS

First Office Action issued by the State Intellectual Property Office of the People's Republic of China dated Jun. 30, 2014, 8pgs.
(Continued)

*Primary Examiner* — Evelyn A Lester
(74) *Attorney, Agent, or Firm* — Ladas & Parry LLP

(57) ABSTRACT

An electrochromic display device comprises: a first electrode substrate; a second electrode substrate; an electrochromic fluid distributed between the first and the second electrode substrate; and a dividing wall located between the first and the second electrode substrate, contacting the first and the second electrode substrate, respectively, and used for isolating the electrochromic fluid into various pixel areas. The electrochromic display device has no interference occurred between adjacent pixel areas. A method for producing such an electrochromic display device is further disclosed.

2 Claims, 2 Drawing Sheets

(51) Int. Cl.
  G02F 1/155 (2006.01)
  G02F 1/061 (2006.01)
  G02F 1/161 (2006.01)
  G02F 1/00 (2006.01)
  G02F 1/01 (2006.01)
  G02F 1/157 (2006.01)
  G02B 27/01 (2006.01)
  G02F 1/167 (2006.01)
  G02F 1/1333 (2006.01)

(56) References Cited

FOREIGN PATENT DOCUMENTS

| CN | 1842738 A | 10/2006 |
| CN | 102112915 A | 6/2011 |
| CN | 102301274 A | 12/2011 |

OTHER PUBLICATIONS

English translation of First Office Action issued by the State Intellectual Property Office of the People's Republic of China dated Jun. 30, 2014, 8pgs.

* cited by examiner

ELECTROCHROMIC DISPLAY DEVICE AND METHOD OF PRODUCING THE SAME

CROSS REFERENCE TO RELATED APPLICATIONS

This application claims priority from Chinese National Application No. 201210295912.7 filed on Aug. 17, 2012, the contents of which are incorporated herein by reference.

FIELD OF INVENTION

The embodiments of the present invention relate to an electrochromic display device and a method of producing the same.

BACKGROUND

Electrochromism refers to a phenomenon that optical properties of a material (e.g., reflectance, transmittance, absorptivity or the like) vary, stably and reversibly, under an external electric field so that the appearance of the material exhibits a reversible change of color and transparency. Materials having an electrochromic property are called as electrochromic material, while a display device made from an electrochromic material is called as electrochromic display device. In comparison with other display devices, the electrochromic display device has many advantages, such as, no blind area, high contrast, low manufacturing cost, wide operating temperature range, low driving voltage, etc., and thus becomes increasingly a hot product among transparent display devices.

FIG. 1 shows a schematic structural view of the prior art electrochromic display device. The electrochromic display device comprises: a first electrode substrate 11, a second electrode substrate 12 located below the first electrode substrate 11, and an electrochromic fluid 13 distributed between the first electrode substrate 11 and the second electrode substrate 12, wherein the first electrode substrate 11 is composed of the first transparent substrate 111 and the first transparent electrode 112; the second electrode substrate 12 is composed of the second transparent substrate 121 and the second transparent electrode 122; and the electrochromic fluid 13 is formed by mixing electrochromic material 131 and electrolyte 132. In addition, the electrochromic fluid 13 is uniformly distributed in various pixel areas of the electrochromic display device (illustrated by pixel area A, pixel area B, and pixel area C in FIG. 1), while the electrochromic fluid in any two adjacent pixel areas is not isolated. When a driving voltage is or is not applied to pixels in any pixel area in the electrochromic display device, the electrochromic material 131 of the electrochromic fluid 13 within the pixel area will vary reversibly from a colored state to a colorless state, so as to achieve the object of display. With respect to the electrochromic display device as shown in FIG. 1, the electrochromic fluid 13 is uniformly distributed in various pixel areas of the electrochromic display device, and the electrochromic fluid in any two adjacent pixel areas is not isolated. Thus, when a driving voltage is applied to the pixels in one of the two adjacent pixel areas of the electrochromic display device while no driving voltage is applied to the pixels in the other pixel area, the electrochromic fluid 13 in the pixel area with a driving voltage applied tends to flow to the adjacent pixel area without a driving voltage applied due to the flowability of the electrochromic fluid 13, so that the electrochromic material in the adjacent pixel area without a driving voltage applied changes color, thereby resulting in a phenomenon that adjacent pixel areas interfere with each other and reducing the display effects and properties of the electrochromic display device.

SUMMARY OF INVENTION

The embodiments of the present invention provide an electrochromic display device and a method of producing the same. The embodiments of the present invention address the problem that pixels in adjacent pixel areas of the electrochromic display device of the prior art interfere with each other, resulting in deterioration of display properties of the electrochromic display device.

An embodiment of the present invention provides an electrochromic display device comprising: a first electrode substrate, a second electrode substrate located below the first electrode substrate, and electrochromic fluid distributed between the first and the second electrode substrates, wherein the electrochromic display device further comprises: at least one dividing wall located between the first and the second electrode substrates, contacting the first and the second electrode substrates, respectively, and used for isolating the electrochromic fluid in various pixel areas.

Another embodiment of the present invention further discloses a method for producing an electrochromic display device comprising: using a first electrode substrate, electrochromic fluid, and a second electrode substrate to form an electrochromic cell, wherein the electrochromic fluid is distributed between the first and the second electrode substrates; and forming at least one dividing wall in the electrochromic cell, wherein the dividing wall is located between the first and the second electrode substrates, contacts the first and the second electrode substrates, respectively, and is used for isolating the electrochromic fluid in various pixel areas.

DETAILED DESCRIPTION OF INVENTION

The embodiments of the present invention provide an electrochromic display device and a method of producing the same. The electrochromic display device comprises: a first electrode substrate; a second electrode substrate; electrochromic fluid distributed between the first and the second electrode substrates; and at least one dividing wall, wherein the at least one dividing wall is located between the first and the second electrode substrates, contacts the first and the second electrode substrates, respectively, and is used for isolating the electrochromic fluid in various pixel areas. In the embodiments of the present invention, the electrochromic fluid is isolated in various pixel areas, thereby avoiding the interference between the electrochromic fluid in adjacent pixel areas and increasing in turn the display effects of the electrochromic display device.

Figure 2:
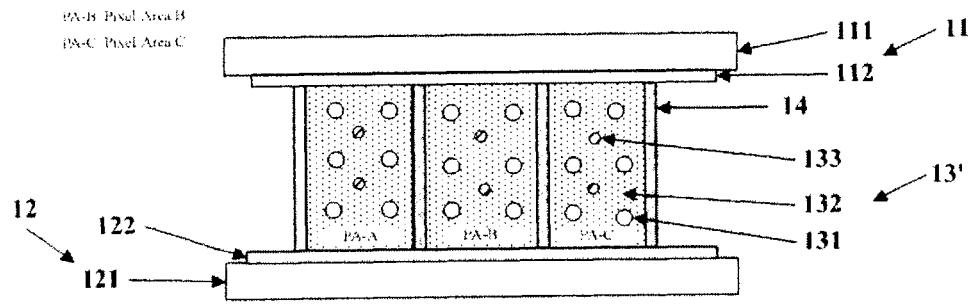
FIG. 2 shows a schematic structural view of the electrochromic display device according to the first embodiment of the present invention.

Referring to FIG. 2, the first embodiment of the present invention provides an electrochromic display device comprising: a first electrode substrate 11, a second electrode substrate 12 located below the first electrode substrate 11, and electrochromic fluid 13' distributed between the first electrode substrate 11 and the second electrode substrate 12, wherein the electrochromic display device further comprises: at least one dividing wall 14 located between the first electrode substrate 11 and the second electrode substrate 12, contacting the first electrode substrate 11 and the second electrode substrate 12, respectively, and used for isolating the electrochromic fluid 13' in various pixel areas (illustrated by pixel area A, pixel area B, and pixel area C as shown in FIG. 2).

In one aspect, the electrochromic fluid 13' is formed by mixing at least three materials including electrochromic material 131, and electrolyte 132, and photoactive small molecules 133. In general, the electrochromic material 131 may be viologen-based material, thiophene small molecule-based material, or the like. The electrolyte 132 may be a mixture of poly(methyl methacrylate) and metal salt. For instance, the metal salt in the electrolyte may be lithium metal salt or the like, and may comprise 5 to 10 wt % of the electrolyte. Typically, the photoactive small molecules 133 may be formed by mixing cyclobutane-tetracarboxylic dianhydride or its derivatives with an aromatic diamine compound, wherein the cyclobutane-tetracarboxylic dianhydride or its derivatives may comprise 50 wt % of the photoactive small molecules. For example, the photoactive small molecules 133 may comprise 0.5 to 10 wt % of the electrochromic fluid 13'.

Figure 1:
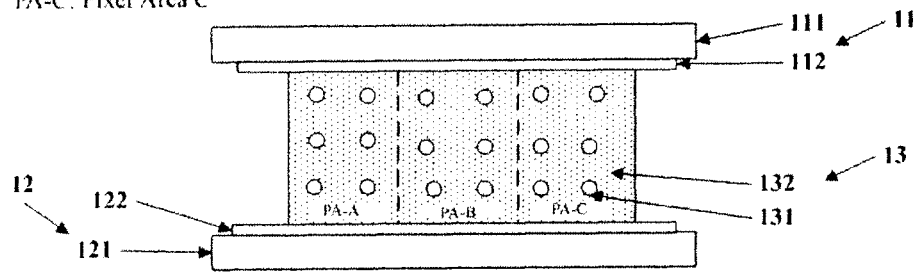
FIG. 1 shows a schematic structural view of electrochromic display device of the prior art.
Figure 3:
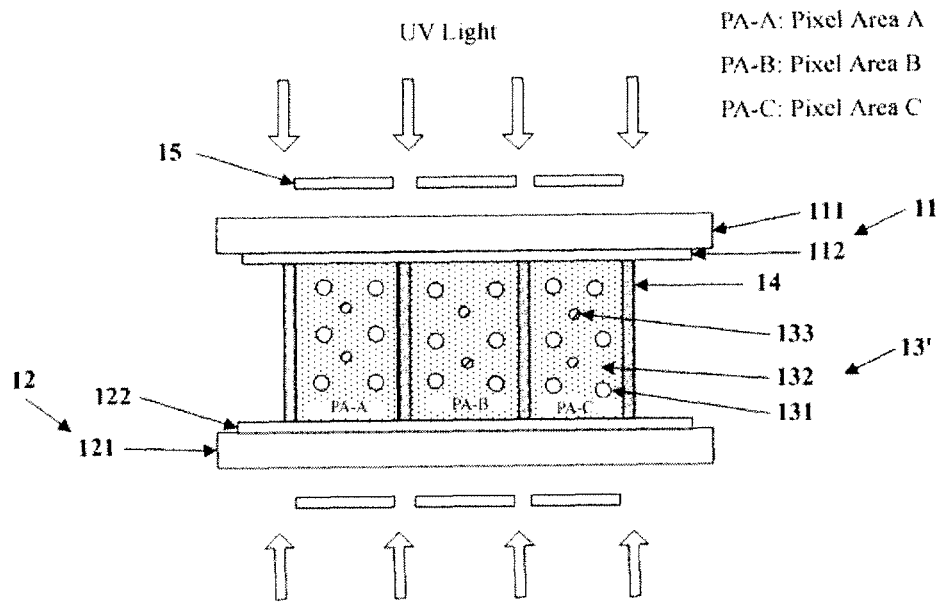
FIG. 3 shows a schematic view for the preparation of a dividing wall of the electrochromic display device according to the first embodiment of the present invention.

FIG. 3 shows a schematic view for the preparation of a dividing wall of the electrochromic display device according to the first embodiment of the present invention. The dividing wall 14 is formed by exposing the electrochromic fluid distributed in a contacting area of adjacent pixel areas to UV light to photopolymerize the photoactive small molecules 133 in the contacting area, wherein the contacting area refers to an interface and adjacent area around the interface of the electrochromic fluid 13' or the electrochromic fluid 13 distributed in adjacent pixel areas before the dividing wall 14 is formed. For instance, the site represented by the dotted line and the adjacent area around the dotted line in the pixel area A and the pixel area B as shown in FIG. 1 is called as a contacting area. The non-contacting area refers to an area other than the contacting area in various pixel areas. Generally, when forming the dividing wall 14, it is required to use the contacting area of any two adjacent pixel areas between the first electrode substrate 11 and the second electrode substrate 12 as an area which need to be exposed to UV light in accordance with the distributing conditions of pixel areas between the first electrode substrate 11 and the second electrode substrate 12. And the determined area between the first electrode substrate 11 and the second electrode substrate 12 which need to be exposed to UV light is subjected to UV exposure by using a mask plate 15 (as shown in FIG. 3), so as to achieve the object of exposing the electrochromic fluid 13' in the contacting area of adjacent pixel areas between the first electrode substrate 11 and the second electrode substrate 12 to UV light.

The dividing wall 14 being formed is uniformly distributed between the first electrode substrate 11 and the second electrode substrate 12.

Chain initiation reaction of polymer may occur when photopolymerizing the photoactive small molecules 133, and thus the formed polymer is non-oriented. Thus, for the purpose of ensuring the formation of the dividing wall 14, it is required to radiate the electrochromic fluid 13' in the area between the first electrode substrate 11 and the second electrode substrate 12 which need not to be exposed to UV light (i.e., the electrochromic fluid 13' distributed in the non-contacting area of adjacent pixel areas) with a polarized light (specially, radiating with a horizontal or a vertical polarized light) after exposing the fluid 13' distributed in the contacting area of adjacent pixel areas, so as to ensure the decomposition of the polymer formed by the photopolymerization of the photoactive small molecules in the area which need not to be exposed to UV light. In particular, the polarized light radiation may be carried out with a Hg UV lamp at a wavelength of 254 nm and an intensity of 0.5 to 3 mW/cm$^2$.

Furthermore, the first electrode substrate 11 of the electrochromic display device is composed of a first transparent substrate 111 and a first transparent electrode 112; and the second electrode substrate 12 is composed of a second transparent substrate 121 and a second transparent electrode 122. Among these, the first transparent substrate 111 and the second transparent substrate 121 may be made from glass or the like, while the first transparent electrode 112 and the second transparent electrode 122 may be made from transparent conductive electrode material (e.g., indium tin oxide (ITO) or the like.

The so-formed electrochromic display device comprises: a first electrode substrate; a second electrode substrate; an electrochromic fluid distributed in the first and the second electrode substrates; and at least one dividing wall located between first electrode substrate and the second electrode substrate, contacting the first and the second electrode substrates, respectively, and used for isolating the electrochromic fluid in various pixel areas. In the embodiments of the present invention, the electrochromic fluid is isolated in various pixel areas in the embodiments of the present invention, thereby avoiding the interference between the electrochromic fluid in adjacent pixel areas and increasing in turn the display properties of the electrochromic display device.

Figure 4:
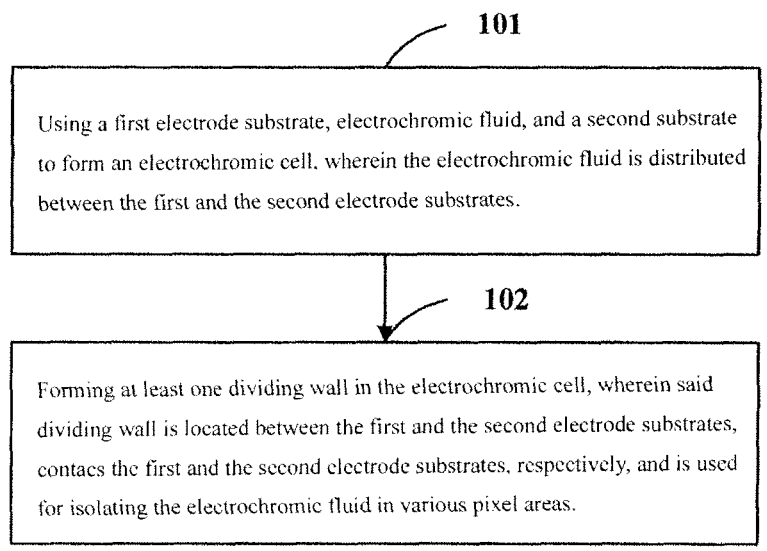
FIG. 4 shows a schematic flowchart for the preparation of the electrochromic display device according to the second embodiment of the present invention.

Now referring to FIG. 4, the second embodiment of the present invention provides a method for producing an electrochromic display device comprising: using a first electrode substrate, electrochromic fluid, and a second electrode substrate to form an electrochromic cell, wherein the electrochromic fluid is distributed in the first and the second electrode substrates; and forming at least one dividing wall in the electrochromic cell, wherein the dividing wall is located between the first and the second electrode substrates, contacts the first and the second electrode substrates, respectively, and is used for isolating the electrochromic fluid in various pixel areas.

In one aspect, the electrochromic material may be a viologen-based material or a thiophene small molecule-based material. The electrolyte may be a mixture of poly(methyl methacrylate) and metal salt, wherein the metal salt in the electrolyte may be a lithium metal salt or the like, and may comprise 5 to 10 wt % of the electrolyte. Moreover, the photoactive small molecules may be formed by mixing cyclobutane-tetracarboxylic dianhydride or its derivatives with an aromatic diamine compound, wherein the cyclobutane-tetracarboxylic dianhydride or its derivatives may comprise 50 wt % of the photoactive small molecules. For example, the photoactive small molecules may comprise 0.5 to 10 wt % of the electrochromic fluid.

In another aspect, the first electrode substrate is composed of a first transparent substrate and a first transparent electrode, and the second electrode substrate is composed of a second transparent substrate and a second transparent electrode, wherein the first and the second transparent substrates may be made from glass or the like, and the first and the second transparent electrodes may be made from a transparent conductive electrode material (e.g., ITO).

In still another aspect, forming at least one dividing wall in the electrochromic cell comprises: exposing the electrochromic fluid in the contacting area between adjacent pixel areas in the electrochromic cell to UV light to photopolymerize the photoactive small molecules in the contacting area so as to form the dividing wall. For example, in accordance with the distributing conditions of pixel areas between the first electrode substrate and the second electrode substrate, the contacting area of any two adjacent pixel areas between the first and the second electrode substrates may be used as an area between the first and the second electrode substrates which need to be exposed to UV light. And the determined area between the first and the second electrode substrates which need to be exposed to UV light is subjected to UV exposure by using a mask plate, so as to achieve the object of exposing the electrochromic fluid in the contacting area of adjacent pixel areas between the first electrode substrate 11 and the second electrode substrate 12 to UV light and photopolymerizing the photoactive small molecules in the UV-exposed area to form a dividing wall (polymer).

Chain initiation reaction of polymer may occur when photopolymerizing the photoactive small molecules 133, and thus the formed polymer is non-oriented. Thus, for the purpose of ensuring the formation of the dividing wall 14, it is required to radiate the electrochromic fluid 13' in the area between the first electrode substrate 11 and the second electrode substrate 12 which need not to be exposed to UV light (i.e., the electrochromic fluid 13' distributed in the non-contacting area of adjacent pixel areas) with a polarized light (specially, radiating with a horizontal or a vertical polarized light) after exposing the fluid 13' distributed in the contacting area of adjacent pixel areas to UV light, so as to ensure the decomposition of the polymer formed by the photopolymerization of the photoactive small molecules in the area which need not to be exposed to UV light. In particular, the polarized light radiation may be carried out with a Hg UV lamp at a wavelength of 254 nm and an intensity of 0.5 to 3 mW/cm$^2$.

Example 1

Preparation of Electrochromic Display Device

A first electrode substrate and a second electrode substrate are prepared by forming the substrates with glass and forming the electrodes with indium tin oxide (ITO, a transparent conductive material) having a thickness of 400 Å. 1-Dimethyl-4,4-bipyridinium-dichloride (a viologen-based material) is used as electrochromic material. A mixture of poly(methyl methacrylate) and lithium perchlorate (LiClO$_4$, lithium metal salt) is used as electrolyte. A mixture of cyclobutane-tetracarboxylic dianhydride and p-phenylenediamine (an aromatic diamine compound) is used as the photoactive small molecules. The electrochromic fluid is composed of 20 wt % of 1-Dimethyl-4,4-bipyridinium-dichloride, 73 wt % of poly (methyl methacrylate), 5 wt % of lithium perchlorate (LiClO4), 1 wt % cyclobutane-tetracarboxylic dianhydride, and 1 wt % of p-phenylenediamine.

Then, the first electrode substrate, the electrochromic fluid, and the second electrode substrate are used to form an electrochromic cell, wherein the electrochromic fluid is distributed in the first and the second electrode substrates. The area between the first and the second electrode substrates which is filled with the electrochromic fluid is divided to various pixel areas (illustrated by pixel area A, pixel area B, and pixel area C in FIG. 2), and the electrochromic fluid distributed in each contacting area between adjacent pixel areas is radiated at a wavelength of 313 nm with a 1 mW/cm$^2$ Hg UV lamp, so as to photopolymerize the photoactive small molecules in the contacting area to form a dividing wall. Then, the electrochromic fluid distributed in the non-contacting area in the adjacent pixel areas, which need not to be exposed to UV light between the first and the second electrode substrates, is radiated with a polarized light at a wavelength of 254 nm with 1 mW/cm$^2$ Hg UV lamp, so as to ensure the decomposition of the polymer formed by the photopolymerization of the photoactive micromolecules, thereby forming an electrochromic display device according to the present invention.

Comparison Example

Preparation of Prior Art Electrochromic Display Device

The electrochromic display device for comparison is prepared as follows. A first electrode substrate and a second electrode substrate are prepared by forming the substrates with glass and forming the electrodes with indium tin oxide having a thickness of 400 Å. The electrochromic fluid used in the comparison example is composed of 20 wt % of 1-dimethyl-4,4-bipyridinium-dichloride, 75 wt % of poly(methyl methacrylate), and 5 wt % of lithium perchlorate (LiClO$_4$).

Then, the first electrode substrate, the electrochromic fluid, and the second electrode substrate are used to form an electrochromic cell (i.e., an electrochromic display device), which has a structure similar to that of FIG. 1, that is to say, no dividing wall is formed in the electrochromic display device of prior art.

Display effects of the electrochromic display device produced in accordance with Example 1 and the electrochromic display device produced in accordance with the comparison example were observed. The electrochromic display device made in Example 1 showed no color change in the adjacent pixel areas when a driving voltage was applied to pixels in one pixel area. The electrochromic display device made in the comparison example showed that color change occurred in the adjacent pixel areas when a driving voltage was applied to pixels in one pixel area, indicating occurrence of interference.

It is apparent that persons skilled in the art can make various modifications and variations to the present invention without departing the spirit and scope. Thus, the present invention is intended to encompass such modifications and variations provided that these modifications and variations fall with the scope as defined by the appended claims or its equivalence.

I claim:

1. A method for producing an electrochromic display device comprising:
   using a first electrode substrate, electrochromic fluid, and a second electrode substrate to form an electrochromic cell, wherein the electrochromic fluid is distributed between the first and the second electrode substrate; and
   forming at least one dividing wall in the electrochromic cell, wherein the dividing wall is located between the first and the second electrode substrates, contacts the first and the second electrode substrates, respectively, and is used for isolating the electrochromic fluid in various pixel areas,
   wherein:
   the electrochromic fluid is formed by mixing at least three materials including electrochromic material, electrolyte, and photoactive small molecules; and wherein
   forming at least one dividing wall in the electrochromic cell comprises: exposing the electrochromic fluid in a contacting area of adjacent pixel areas in the electrochromic cell to UV light to photopolymerize the photoactive small molecules in the contacting area, to form the dividing wall.

2. A method for producing an electrochromic display device comprising:
- using a first electrode substrate, electrochromic fluid, and a second electrode substrate to form an electrochromic cell, wherein the electrochromic fluid is distributed between the first and the second electrode substrate; and
- forming at least on dividing wall in the electrochromic cell, wherein the dividing wall is located between the first and the second electrode substrates, contacts the first and the second electrode substrates, respectively, and is used for isolating the electrochromic fluid in various pixel areas, wherein:
- the electrochromic fluid is formed by mixing at least three materials including electrochromic material, electrolyte, and photoactive small molecules; and wherein
- forming at least one dividing wall in the electrochromic cell comprises: exposing the electrochromic fluid in a contacting area of adjacent pixel areas in the electrochromic cell to UV light to photopolymerize the photoactive small molecules in the contacting area to forming the dividing wall, followed by radiating the electrochromic fluid distributed in a non-contacting area of adjacent pixel areas with polarized light to decompose polymer formed by the photopolymerization of the photoactive small molecules in the non-contacting area, to form the dividing wall.

* * * * *